UNITED STATES PATENT OFFICE.

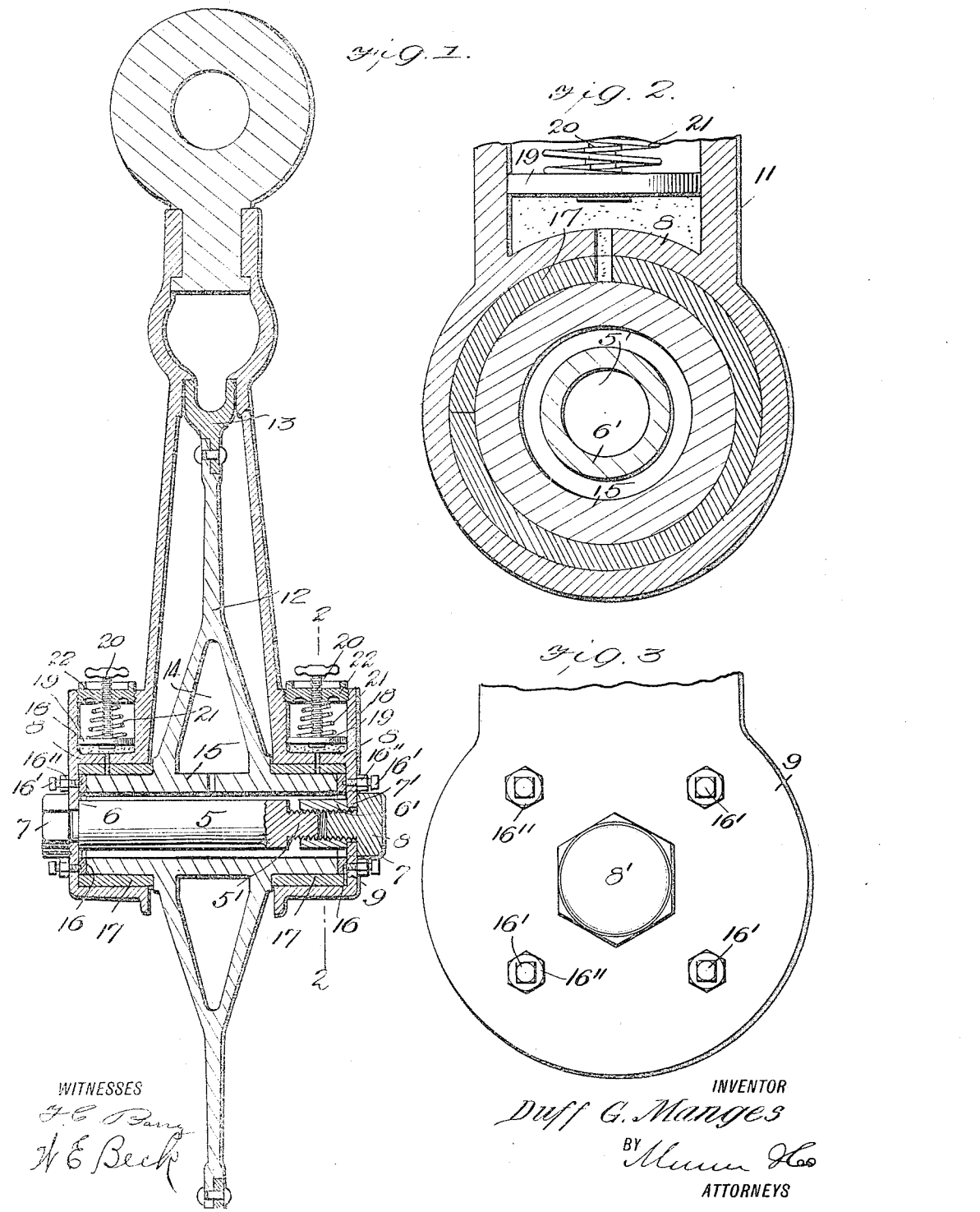

DUFF GERARD MANGES, OF TELLICO PLAINS, TENNESSEE.

SHEAVE-BLOCK.

1,213,670.  Specification of Letters Patent.  Patented Jan. 23, 1917.

Application filed June 3, 1916. Serial No. 101,466.

*To all whom it may concern:*

Be it known that I, DUFF G. MANGES, a citizen of the United States, and a resident of Tellico Plains, in the county of Monroe and State of Tennessee, have invented an Improvement in Sheave-Blocks, of which the following is a specification.

This invention is an improvement in power transmission and has particular reference to a sheave block.

An object of the invention is to provide a novel mounting for the sheave or pulley whereby the same is securely maintained in proper position in its housing and the latter, in turn, also held in position, and to this end, the housing is provided with suitable recesses through which extends an adjustable shaft or pin supporting the housing in position and surrounded, in spaced relation, by a sleeve, the ends of which are supported in said recesses by suitable bearings while the central portion has mounted thereon the sheave proper.

The inventive idea involved is capable of receiving a variety of mechanical expressions, one of which, for the purpose of illustrating the invention, is shown in the accompanying drawing, in which—

Figure 1 is a vertical sectional view taken through the sheave and the housing therefor. Fig. 2 is a section on the line 2—2 of Fig. 1. Fig. 3 is a fragmentary side elevation.

There is illustrated what is now believed to be a preferred form of the invention in which a central pin or shaft 5 is reduced adjacent one end to provide a shoulder 6, said end being screw-threaded to receive a nut 7 for retaining one section 8 of the housing in position. The pin or shaft 5 is preferably made in sections adjustable relatively to each other to vary the length of said shaft and for this purpose the main portion thereof is reduced and screw-threaded as indicated at 5' to receive thereon one end of the internally threaded coupling 6'. The other end of this coupling is externally reduced to provide a shoulder 7' against which the other section 8 of the housing abuts whereby the same is retained in position, it being held in place by a bolt member 8' threaded into the other end of the coupling 6'. It will thus be seen that movement of the sections of the housing toward each other is prevented and that the sections of the housing may be adjusted to compensate for wear, which facts materially assist in retaining the sheave 12 in proper position within the housing. Each section of the housing is provided in its lower end with an outwardly projecting cup-shaped portion 9 to provide a recess which, when the housing is in position, is oppositely disposed relatively to the recess in the other section of the housing.

The sheave 12 may be of any construction and is preferably provided at its periphery with a detachable rim member 13 and adjacent its center with an oil cavity 14. The central portion of the sheave preferably comprises an integrally formed sleeve member 15, the ends of which project a considerable distance beyond the faces of the sheaves and extend into the portions 9 of the housing. It will be understood, of course, that this sleeve member 15 may be made separately from the sheave in which event the same is keyed thereto in any preferred manner. The interior of the sleeve member 15 is of a diameter greater than the diameter of the pin or shaft 5 whereby an annular space is formed between said parts for a purpose which will appear in the course of the description. The length of the sleeve member 15 is slightly less than the distance between the inner faces of the recesses in the portions 9 and between said ends and faces there are interposed bearing rings 16 which are adapted to take up the end thrust of said sleeve member in the housing. In order to further compensate for wear these rings 16 are also made adjustable by the provision of a number of set screws 16' secured in position by means of jam nuts 16''. The sleeve member 15 is further supported in position by means of annular bearings 17 which surround the portions of the sleeve member 15 between the outer end thereof and the faces of the sheave and also overlap and engage the periphery of the bearing rings 16.

In sheave blocks of this construction used in heavy work, it is difficult to properly lubricate the parts with liquid oil since the said block runs in many different positions and therefore it is preferable to lubricate with grease. To this end, each section of the housing is provided with a grease cup 18 in which is mounted a piston 19 operated by the screw member 20, a spring 21 being interposed between said piston and the closure 22 of the cup.

It will thus be seen from the foregoing description that the sheave is mounted in such a way that lateral movement relative to the housing is prevented and as the annular bearings are worm, by reason of the stress and friction thereon, the space between sleeve member 15 and shaft 5 will permit of said sleeve at all times engaging said bearings.

What is claimed is:

1. A sheave block comprising a central shaft made in sections adjustable relatively to each other, a sleeve member surrounding said shaft in spaced relation thereto, a sheave carried by said sleeve, a housing for inclosing said sheave comprising sections provided with oppositely disposed cup-shaped portions forming recesses into which project the ends of said sleeve member, bearing rings interposed between said ends and the inner faces of said recesses, other bearing members mounted in said cup-shaped portions and surrounding the ends of said sleeve member, said cup-shaped portions being provided with openings for receiving the reduced threaded ends of said shaft, the portions of said housing surrounding said openings engaging the shoulders of said shaft, and means mounted upon the ends of said shaft for retaining the sections of said housing in position.

2. A sheave block comprising a central shaft having reduced ends to provide shoulders, a sleeve member surrounding said shaft in spaced relation thereto, a sheave carried by said sleeve, a housing for inclosing said sheave comprising sections provided with oppositely disposed cup-shaped portions forming recesses into which project the ends of said sleeve member, bearing rings interposed between said ends and the inner faces of said recesses, bearing members mounted in said cup-shaped portions and surrounding the ends of said sleeve member and overlapping and engaging the periphery of said bearing rings, said cup-shaped portions being provided with openings for receiving the reduced threaded ends of said shaft, the portions of said housing surrounding said openings engaging the shoulders of said shaft, and means mounted upon the ends of said shaft for retaining the sections of said housing in position.

3. A sheave block comprising a sectional shaft having the sections thereof adjustable relatively to each other, a sleeve member surrounding said shaft, a sheave carried by said sleeve member, a housing for said sheave having recesses into which the ends of said sleeve member projects, and bearing members interposed between the ends of said sleeve member and the inner faces of said recesses.

4. A sheave block comprising a sectional shaft having the sections thereof adjustable relatively to each other, a sleeve member surrounding said shaft, a sheave carried by said sleeve member, a housing for said sheave having recesses into which the ends of said sleeve member project, bearing members interposed between the ends of said sleeve member and the inner faces of said recesses, and other bearing members surrounding the ends of said sleeve members and overlapping the first named bearing members.

5. A sheave block comprising a shaft, including relatively adjustable sections, a coupling for joining said sections, a sheave housing partially supported by said coupling, and a sheave carrying sleeve member in said housing and surrounding said shaft.

6. A sheave block comprising a shaft, including relatively adjustable sections, a coupling for joining said sections, a sheave housing partially supported by said coupling, a sheave carrying sleeve member in said housing and surrounding said shaft, and bearings mounted in said housing and engaging said sleeve member.

DUFF GERARD MANGES.

Copies of this patent may be obtained for five cents each, by addressing the "Commissioner of Patents, Washington, D. C."